(12) United States Patent
Walker

(10) Patent No.: US 11,580,039 B2
(45) Date of Patent: *Feb. 14, 2023

(54) CHANNEL DEPTH ADJUSTMENT IN MEMORY SYSTEMS

(71) Applicant: Micron Technology, Inc., Boise, ID (US)

(72) Inventor: Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/099,309

(22) Filed: Nov. 16, 2020

(65) Prior Publication Data

US 2021/0081338 A1    Mar. 18, 2021

Related U.S. Application Data

(63) Continuation of application No. 13/089,621, filed on Apr. 19, 2011, now Pat. No. 10,838,886.

(51) Int. Cl.
*G06F 13/16* (2006.01)
*G06F 12/06* (2006.01)
*G06F 12/10* (2016.01)

(52) U.S. Cl.
CPC ...... *G06F 13/1678* (2013.01); *G06F 12/0607* (2013.01); *G06F 12/10* (2013.01); *G06F 2212/1016* (2013.01); *G06F 2212/1028* (2013.01); *Y02D 10/00* (2018.01)

(58) Field of Classification Search
CPC .. G06F 13/1678; G06F 12/0607; G06F 12/10; G06F 2212/1016; G06F 2212/1028; Y02D 10/00
See application file for complete search history.

(56) References Cited

U.S. PATENT DOCUMENTS

| 5,305,445 A | 4/1994 | Nishikawa |
| 5,465,332 A | 11/1995 | Deloye et al. |
| 5,504,871 A | 4/1996 | Takashi |
| 6,125,421 A | 9/2000 | Roy |
| 6,393,545 B1 | 5/2002 | Long et al. |

(Continued)

FOREIGN PATENT DOCUMENTS

| CN | 101438230 A | 5/2009 |
| CN | 101483061 A | 7/2009 |

(Continued)

OTHER PUBLICATIONS

U.S. Appl. No. 13/089,621 U.S. Pat. No. 10,838,886, filed Apr. 19, 2011, Channel Depth Adjustment in Memory Systems.

(Continued)

*Primary Examiner* — Hiep T Nguyen
(74) *Attorney, Agent, or Firm* — Schwegman Lundberg & Woessner, P.A.

(57) ABSTRACT

Memory devices, systems and methods are described, such as those including a dynamically configurable channel depth. Devices, systems and methods are described that adjust channel depth based on hardware and/or software requirements. One such device provides for virtual memory operations where a channel depth is adjusted for the same physical memory region responsive to requirements of different memory processes.

20 Claims, 3 Drawing Sheets

(56) References Cited

U.S. PATENT DOCUMENTS

| | | | |
|---|---|---|---|
| 6,411,302 | B1 | 6/2002 | Chiraz |
| 6,457,113 | B1 | 9/2002 | Kobayashi et al. |
| 6,470,409 | B1 | 10/2002 | Ridgeway |
| 6,625,685 | B1 | 9/2003 | Cho et al. |
| 6,816,165 | B1 | 11/2004 | Radke |
| 6,847,650 | B1 | 1/2005 | Stone et al. |
| 6,978,259 | B1 | 12/2005 | Anderson et al. |
| 7,260,656 | B2 | 8/2007 | Matsunami et al. |
| 7,765,366 | B2 | 7/2010 | Akiyama et al. |
| 7,779,215 | B2 | 8/2010 | Liou et al. |
| 7,797,319 | B2 | 9/2010 | Piedmonte |
| 8,018,752 | B2 | 9/2011 | Jeddeloh |
| 8,892,844 | B2 | 11/2014 | Walker |
| 9,933,972 | B2 | 4/2018 | Walker |
| 10,162,557 | B2 | 12/2018 | Walker |
| 10,838,886 | B2 | 11/2020 | Walker |
| 2001/0039605 | A1 | 11/2001 | Uematsu |
| 2003/0088742 | A1* | 5/2003 | Lee ................. G06F 12/084 711/147 |
| 2004/0165571 | A1* | 8/2004 | Reznik .............. H04L 1/1829 370/349 |
| 2005/0033935 | A1 | 2/2005 | Manbert et al. |
| 2005/0120160 | A1 | 6/2005 | Plouffe et al. |
| 2006/0129728 | A1 | 6/2006 | Hampel |
| 2006/0129767 | A1 | 6/2006 | Berenyi et al. |
| 2006/0233367 | A1 | 10/2006 | Birrell et al. |
| 2006/0294325 | A1 | 12/2006 | Akiyama et al. |
| 2007/0226795 | A1 | 9/2007 | Conti et al. |
| 2007/0260782 | A1 | 11/2007 | Shaikli |
| 2008/0141043 | A1 | 6/2008 | Flynn et al. |
| 2008/0250212 | A1 | 10/2008 | Asaro et al. |
| 2008/0256292 | A1 | 10/2008 | Flynn et al. |
| 2008/0320476 | A1 | 12/2008 | Wingard et al. |
| 2009/0182976 | A1 | 7/2009 | Agesen |
| 2009/0307455 | A1 | 12/2009 | Pliss et al. |
| 2009/0307458 | A1 | 12/2009 | Nogueras et al. |
| 2010/0115228 | A1 | 5/2010 | V et al. |
| 2010/0220359 | A1 | 9/2010 | Ohgishi |
| 2010/0251223 | A1 | 9/2010 | Gordy et al. |
| 2011/0055430 | A1 | 3/2011 | Chen et al. |
| 2011/0107054 | A1 | 5/2011 | Hepkin et al. |
| 2011/0314238 | A1 | 12/2011 | Finkler et al. |
| 2012/0191921 | A1 | 7/2012 | Shaeffer et al. |
| 2012/0233413 | A1 | 9/2012 | Walker |
| 2012/0272031 | A1 | 10/2012 | Walker |
| 2015/0074370 | A1 | 3/2015 | Walker |
| 2018/0165238 | A1* | 6/2018 | Depew ................. G06F 11/349 |
| 2018/0300079 | A1 | 10/2018 | Walker |

FOREIGN PATENT DOCUMENTS

| | | |
|---|---|---|
| CN | 103493026 A | 1/2014 |
| CN | ZL 201280019658.6 | 2/2017 |
| CN | 107025181 A | 8/2017 |
| EP | 0777233 A1 | 6/1997 |
| EP | 2684133 B1 | 5/2018 |
| JP | 9259041 A | 10/1997 |
| JP | 10232819 A | 9/1998 |
| JP | 2005100418 A | 4/2005 |
| JP | 2006024233 A | 1/2006 |
| JP | 2008544414 A | 12/2008 |
| KR | 100268321 B1 | 10/2000 |
| KR | 1020080014066 A | 2/2008 |
| KR | 1020090130755 A | 12/2009 |
| KR | 101993651 B1 | 6/2019 |
| TW | 201027541 A | 7/2010 |
| TW | I541648 B | 7/2016 |
| WO | WO-2004029816 A2 | 4/2004 |
| WO | WO-2010111281 A2 | 9/2010 |
| WO | WO-2012122182 A2 | 9/2012 |
| WO | WO-2012122182 A3 | 9/2012 |
| WO | WO-2012145432 A3 | 10/2012 |

OTHER PUBLICATIONS

U.S. Appl. No. 13/042,164 U.S. Pat. No. 8,892,844, filed Mar. 7, 2011, Methods of Accessing Memory Cells, Methods of Distributing Memory Requests, Systems, and Memory Controllers.

U.S. Appl. No. 14/542,750 U.S. Pat. No. 9,933,972, filed Nov. 17, 2014, Methods of Accessing Memory Cells, Methods of Distributing Memory Requests, Systems, and Memory Controllers.

U.S. Appl. No. 16/230,157, filed Dec. 21, 2018, Methods of Accessing Memory Cells, Methods of Distributing Memory Requests, Systems, and Memory Controllers.

U.S. Appl. No. 15/918,178 U.S. Pat. No. 10,162,557, filed Mar. 12, 2018, Methods of Accessing Memory Cells, Methods of Distributing Memory Requests, Systems, and Memory Controllers.

"Korean Application Serial No. 10-2020-7012840, Response filed Nov. 25, 2020 to Notice of Preliminary Rejection dated Jun. 29, 2020", w English Claims, 13 pgs.

U.S. Appl. No. 13/042,164, Restriction Requirement dated Aug. 15, 2013, 6 pgs.

U.S. Appl. No. 13/042,164, Response filed Sep. 16, 2013 to Restriction Requirement dated Aug. 15, 2013, 9 pgs.

U.S. Appl. No. 13/042,164, Non Final Office Action dated Nov. 18, 2013, 9 pgs.

U.S. Appl. No. 13/042,164, Response filed Feb. 18, 2014 to Non Final Office Action dated Nov. 18, 2013, 7 pgs.

U.S. Appl. No. 13/042,164, Final Office Action dated May 2, 2014, 8 pgs.

U.S. Appl. No. 13/042,164, Response filed Jul. 1, 2014 to Final Office Action dated May 2, 2014, 7 pgs.

U.S. Appl. No. 13/042,164, Notice of Allowance dated Jul. 18, 2014, 7 pgs.

U.S. Appl. No. 13/089,621, Non Final Office Action dated Sep. 11, 2013, 21 pgs.

U.S. Appl. No. 13/089,621, Response filed Dec. 11, 2013 to Non Final Office Action dated Sep. 11, 2013, 8 pgs.

U.S. Appl. No. 13/089,621, Final Office Action dated Mar. 12, 2014, 23 pgs.

U.S. Appl. No. 13/089,621, Response filed Jun. 12, 2014 to Final Office Action dated Mar. 12, 2014, 8 pgs.

U.S. Appl. No. 13/089,621, Advisory Action dated Jun. 26, 2014, 3 pgs.

U.S. Appl. No. 13/089,621, Non Final Office Action dated Dec. 17, 2014, 25 pgs.

U.S. Appl. No. 13/089,621, Response filed Mar. 17, 2015 to Non Final Office Action dated Dec. 17, 2014, 9 pgs.

U.S. Appl. No. 13/089,621, Final Office Action dated Apr. 16, 2015, 32 pgs.

U.S. Appl. No. 13/089,621, Response filed Jun. 16, 2015 to Final Office Action dated Apr. 16, 2015, 8 pgs.

U.S. Appl. No. 13/089,621, Advisory Action dated Jul. 2, 2015, 5 pgs.

U.S. Appl. No. 13/089,621, Response filed Aug. 17, 2015 to Advisory Action dated Jul. 2, 2015, 12 pgs.

U.S. Appl. No. 13/089,621, Examiner Interview Summary dated Oct. 16, 2015, 2 pgs.

U.S. Appl. No. 13/089,621, Non Final Office Action dated Oct. 28, 2015, 36 pgs.

U.S. Appl. No. 13/089,621, Response filed Jan. 28, 2016 to Non Final Office Action dated Oct. 28, 2015, 11 pgs.

U.S. Appl. No. 13/089,621, Final Office Action dated Mar. 17, 2016, 32 pgs.

U.S. Appl. No. 13/089,021, Response filed May 17, 2016 to Final Office Action dated Mar. 17, 2016, 11 pgs.

U.S. Appl. No. 13/089,621, Non Final Office Action dated Sep. 23, 2016, 29 pgs.

U.S. Appl. No. 13/089,621, Response filed Dec. 22, 2016 to NonFinal Office Action dated Sep. 23, 2016, 9 pgs.

U.S. Appl. No. 13/089,621, Final Office Action dated Feb. 8, 2017, 32 pgs.

U.S. Appl. No. 13/089,621, Response filed Aug. 8, 2017 to Final Office Action dated Feb. 8, 2017, 9 pgs.

(56) References Cited

OTHER PUBLICATIONS

U.S. Appl. No. 13/089,621, Non Final Office Action dated Dec. 18, 2017, 17 pgs.
U.S. Appl. No. 13/089,621, Response filed Mar. 19, 2018 to Non-Final Office Action dated Dec. 18, 2017, 11 pgs.
U.S. Appl. No. 13/089,621, Final Office Action dated Apr. 24, 2018, 19 pgs.
U.S. Appl. No. 13/089,621, Response filed Oct. 24, 2018 to Final Office Action dated Apr. 24, 2018, 13 pgs.
U.S. Appl. No. 13/089,621, Non Final Office Action dated Jun. 24, 2019, 25 pgs.
U.S. Appl. No. 13/089,621, Response filed Oct. 24, 2019 to Non-Final Office Action dated Jun. 24, 2019, 10 pgs.
U.S. Appl. No. 13/089,621, Non Final Office Action dated Oct. 25, 2019, 28 pgs.
U.S. Appl. No. 13/089,621, Response filed Mar. 25, 2020 to Non Final Office Action dated Nov. 25, 2019, 10 pgs.
U.S. Appl. No. 13/089,621, Notice of Allowance dated Apr. 15, 2020, 8 pgs.
U.S. Appl. No. 13/089,621, Notice of Allowance dated Aug. 17, 2020, 8 pgs.
U.S. Appl. No. 14/542,750, Restriction Requirement dated Jul. 1, 2016, 6 pgs.
U.S. Appl. No. 14/542,750, Response filed Jul. 28, 2016 to Restriction Requirement dated Jul. 1, 2016, 6 pgs.
U.S. Appl. No. 14/542,750, Non Final Office Action dated Oct. 5, 2016, 10 pgs.
U.S. Appl. No. 14/542,750, Response filed Feb. 6, 2017 to Non Final Office Action dated Oct. 5, 2016, 8 pgs.
U.S. Appl. No. 14/542,750, Final Office Action dated Apr. 28, 2017, 7 pgs.
U.S. Appl. No. 14/542,750, Response filed Jun. 23, 2017 to Final Office Action dated Apr. 28, 2017, 5 pgs.
U.S. Appl. No. 14/542,750, Notice of Allowance dated Aug. 4, 2017, 8 pgs.
U.S. Appl. No. 14/542,750, Notice of Allowance dated Dec. 5, 2017, 5 pgs.
U.S. Appl. No. 15/918,178, Non Final Office Action dated Jul. 24, 2018, 5 pgs.
U.S. Appl. No. 15/918,178, Response filed Aug. 3, 2018 to Non-Final Office Action dated Jul. 24, 2018, 5 pgs.
U.S. Appl. No. 15/918,178, Notice of Allowance dated Sep. 18, 2018, 8 pgs.
"Chinese Application Serial No. 201280019037.8, Office Action dated May 5, 2016", With English Translation, 21 pgs.
"Chinese Application Serial No. 201280019037.8, Office Action dated Aug. 20, 2015", 23 pgs.
"Chinese Application Serial No. 201280019037.8, Office Action dated Aug. 29, 2016", (With English Translation), 5 pgs.
"Chinese Application Serial No. 201280019037.8, Response filed Nov. 3, 2016 to Office Action dated Aug. 29, 2016", with English Translation, 32 pgs.
"Chinese Application Serial No. 201280019037.8, Response filed Dec. 31, 2015 to Office Action dated Aug. 20, 2015", 12 pgs.
"Chinese Application Serial No. 201280019658.6, Office Action dated Jun. 2, 2016", With English Translation, 7 pgs.
"Chinese Application Serial No. 201280019658.6, Office Action dated Jul. 29, 2015", w/English Translation, 23 pgs.
"Chinese Application Serial No. 201280019658.6, Office Action dated Dec. 15, 2015", W/English Translation, 7 pgs.
"Chinese Application Serial No. 201280019658.6, Response filed Feb. 25, 2016 to Office Action dated Dec. 15, 2015", w/English Claims, 19 pgs.
"Chinese Application Serial No. 201280019658.6, Response filed Aug. 17, 2016 to Office Action dated Jun. 2, 2016", w/Engiish Claims, 22 pgs.
"Chinese Application Serial No. 201280019658.6, Response filed Oct. 19, 2015 to Office Action dated Jul. 29, 2015", w/English Claims, 15 pgs.

"European Application Serial No. 12755210.7 Response filed Jul. 16, 2015 to Extended European Search Report dated Apr. 10, 2015", With the amended claims, 38 pgs.
"European Application Serial No. 12755210.7, Extended European Search Report dated Apr. 10, 2015", 5 pgs.
"European Application Serial No. 12774647.7, Extended European Search Report dated Apr. 15, 2015", 5 pgs.
"European Application Serial No. 12774647.7, Office Action dated Dec. 17, 2013", 3 pgs.
"European Application Serial No. 12774647.7, Response filed Jun. 5, 2014 to Office Action dated Dec. 17, 2013", 5 pgs.
"European Application Serial No. 12774647.7, Response filed Nov. 6, 2015 to Extended European Search Report dated Apr. 15, 2015", 10 pgs.
"European Application Serial No. 18170452.9, Extended European Search Report dated Jul. 20, 2018", 8 pgs.
"International Application Serial No. PCT/US/2012/034125, Search Report dated Nov. 28, 2012", 3 pgs.
"International Application Serial No. PCT/US/2012/034125, Written Opinion dated Nov. 28, 2012", 5 pgs.
"International Application Serial No. PCT/US2012/027905, International Preliminary Report on Patentability dated Oct. 2, 2013", 9 pgs.
"International Application Serial No. PCT/US2012/027905, Search Report dated Sep. 28, 2012", 3 pgs.
"International Application Serial No. PCT/US2012/027905, Written Opinion dated Sep. 28, 2012", 7 pgs.
"International Application Serial No. PCT/US2012/034125, International Preliminary Report on Patentability dated Oct. 31, 2013", 7 pgs.
"Japanese Application Serial No. 2014-506522, Office Action dated Apr. 19, 2016", w/English Translation, 5 pgs.
"Japanese Application Serial No. 2014-506522, Office Action dated Sep. 5, 2017", w/English Translation, 20 pgs.
"Japanese Application Serial No. 2014-506522, Response filed Oct. 16, 2017 to Office Action dated Sep. 5, 2017", w/English Claims, 7 pgs.
"Korean Application Serial No. 10-2013-7025982, Notice of Preliminary Rejection dated Jul. 20, 2018", W/English Translation, 8 pgs.
"Korean Application Serial No. 10-2013-7025982, Response filed Nov. 20, 2018 to Notice of Preliminary Rejection dated Jul. 20, 2018", w/ English Claims, 22 pgs.
"Korean Application Serial No. 10-2013-7030191, Final Office Action dated Nov. 28, 2019", W/English Translation, 7 pgs.
"Korean Application Serial No. 10-2013-7030191, Notice of Preliminary Rejection dated Jul. 31, 2018", W/English Translation, 7 pgs.
"Korean Application Serial No. 10-2013-7030191, Office Action dated Apr. 29, 2019", w/ English translation, 7 pgs.
"Korean Application Serial No. 10-2013-7030191, Response filed Feb. 27, 2020 to Final Office Action dated Nov. 28, 2019", w/ English Claims, 20 pgs.
"Korean Application Serial No. 10-2013-7030191, Response filed Jul. 1, 2019 to Office Action dated Apr. 29, 2019", w/ English Claims, 9 pgs.
"Korean Application Serial No. 10-2013-7030191, Response filed Dec. 11, 2018 to Notice of Preliminary Rejection dated Jul. 31, 2018", w/ English Claims, 17 pgs.
"Korean Application Serial No. 10-2013-7030191, Second Final Office Action dated Mar. 30, 2020", w/ English Translation, 8 pgs.
"Korean Application Serial No. 10-2020-7012840, Notice of Preliminary Rejection dated Jun. 29, 2020", w/ English Translation, 8 pgs.
"Taiwan Application Serial No. 101107727, Office Action dated Dec. 7, 2015", w/English Translation, 12 pgs.
"Taiwan Application Serial No. 101114017, Office Action dated Nov. 17, 2015", 11 pgs.
"Taiwanese Application Serial No. 101107727, Response filed Mar. 10, 2016 to Office Action dated Dec. 7, 2015", w/English Claims, 25 pgs.

(56) References Cited

OTHER PUBLICATIONS

"Taiwanese Application Serial No. 101114017, Response filed Feb. 17, 2016 to Office Action dated Nov. 17, 2015", (English Translation of Claims), 10 pgs.

* cited by examiner

CHANNEL DEPTH ADJUSTMENT IN MEMORY SYSTEMS

PRIORITY APPLICATION

This application is a continuation of U.S. application Ser. No. 13/089,621, filed Apr. 19, 2011, which is incorporated herein by reference in its entirety.

BACKGROUND

Computer memory operation often deals with competing technical hurdles. Fast memory performance can be obtained by designing devices with high bandwidth. However, high bandwidth often requires high amounts of power to operate. Low power consumption is also desirable, and often competes with the desire for faster memory operation. It is desirable to provide memory devices that improve memory speed and also improve power consumption.

DETAILED DESCRIPTION

In the following detailed description of the invention, reference is made to the accompanying drawings that form a part hereof and in which are shown, by way of illustration, specific embodiments in which the invention may be practiced. These embodiments are described in sufficient detail to enable those skilled in the art to practice the invention. Other embodiments may be utilized and material, structural, logical, electrical changes, etc. may be made.

Figure 1:
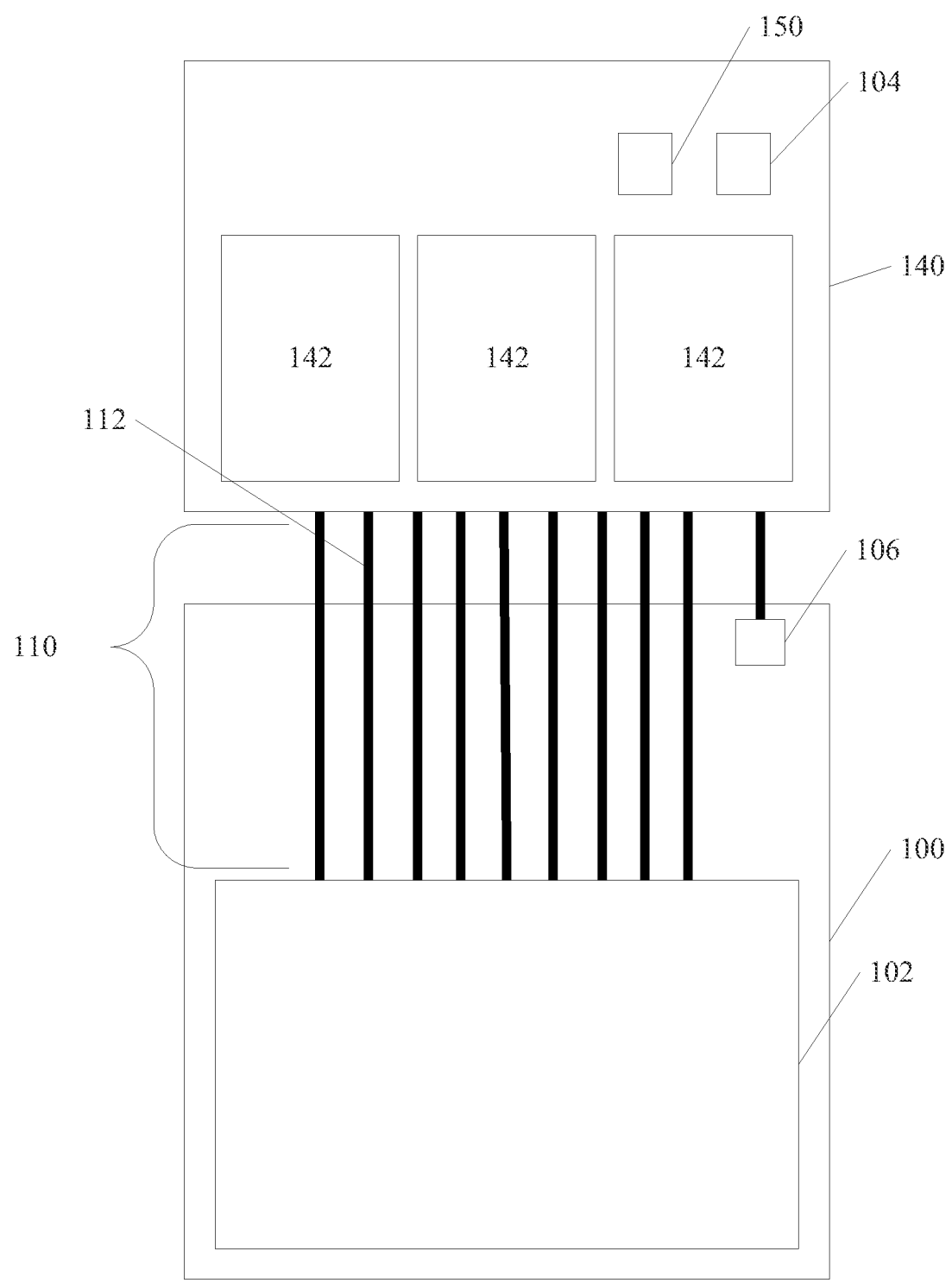
FIG. 1 shows a system that includes a memory system couple to an electronic system according to an embodiment of the invention.

FIG. 1 shows a memory system 100 coupled (e.g., via wireless, non-wireless, or optical interface, for example) to an electronic system 140. Examples of memory systems 100 may include one or more individual memory devices coupled together. In one example, a system that includes the memory system 100 and electronic system 140 can be an information handling system, such as a personal computer, similar to examples described in FIG. 3 below. Other such systems can include, for example, music players, telephones, netbooks, etc. The electronic system 140 in FIG. 1 includes a number of masters 142. Examples of masters 142 include, but are not limited to, hardware devices, such as processors, Graphic Processors (GPUs), etc., or any number of individual software applications. Although multiple masters 142 are shown in FIG. 1, the invention is not so limited. Other configurations include only a single master 142.

The memory system 100 of FIG. 1 includes a memory device 102, such as a module or modules of physical memory (whether centrally located or dispersed throughout a system) which is conceptually divisible (e.g., by a memory map 104) into a number of various memory regions (e.g., portions). The memory system 100 is coupled to and accessed by the electronic system 140 using a dynamic channel 110. The dynamic channel 110 is shown including a number of configurable channel portions 112.

In a memory operation, configurable channel portions 112 are dynamically used, or left idle in the dynamic channel 110. By adding configurable channel portions 112, a channel width can be increased to allow more data to pass from the electronic system 140 to the memory system 100 in parallel. In one example, one or more channel portions 112 includes a configurable depth. In contrast to channel width, in the present disclosure, depth of a channel portion can be defined as, for example, a number of bytes that are accessed using a channel portion 112 before using the next channel portion 112 during a memory operation.

In one example, for a given memory transfer, a selected channel depth also determines a channel width. For example, in a system with 8 available channel portions 112, and a 128 B transfer, if a channel depth is selected as 16 B, then each channel portion will transfer 16 B before incrementing to the next channel portion 112, and the 128 B will be transferred once 8 channel portions have been incremented. If instead, a channel depth is selected as 32 B, then each channel portion will transfer 32 B before incrementing to the next channel portion 112, and the 128B will be transferred once 4 channel portions have been incremented.

In selected memory operations, a wide channel or parallel system (e.g. high bandwidth) beyond a given width is not necessary. For example, in a read operation, if the master 142 receiving the data cannot process the data faster than a given speed, then any extra channel width enabling data speed beyond that given speed is unnecessary. In one example, the dynamic channel 110 is configured to provide a channel depth/width that is optimized for a given master 142. Unused configurable channel portions 112, and the associated memory array are not activated (e.g. powered up), and the memory device 100 is more energy efficient. One example of a memory operation where additional channel width (bandwidth) is not necessary may include a graphics operation. Graphics masters may be more insensitive to latency, and an extra few nanoseconds of time for the data transaction should not affect performance.

The memory system 100 of FIG. 1 also includes a memory map 104, stored as data, and represented in FIG. 1 in block diagram form. In the present disclosure, the memory map is a conceptual structure, stored in memory, and is represented as a block 104 for illustration purposes. In one example, the memory map 104 is stored in non-volatile memory or on a drive and is read at boot time. The memory map 104 tells memory firmware the storage capacity of the memory device 100 and defines variables such as size of different regions of memory, and characteristics of the dynamic channel 110 for the different regions of memory.

In one example, the data from the memory map adjusts a channel depth of one or more configurable channel portions 112 up or down dynamically during memory operations. In one example, the memory map is changed to adjust channel depths of the configurable channel portions 112 of the dynamic channel 110 in response to different masters 142. In one example, the memory map is changed to adjust the channel depths of the configurable channel portions 112 in response to different software applications. Different software applications may utilize data at different speeds. By optimizing channel depth within the dynamic channel 110 to match the software application, power savings may be realized, or improved application speed may be realized, depending on the capabilities of the software application.

In one example, the memory map 104 receives a channel depth selection signal to adjust the channel depth from a memory request. In such a configuration, the channel depth is persistent with data in a memory request. In one example a channel depth is included in memory address bits in a memory request. One example memory request includes bits that correspond to a row select, a bank select, and a column select of a physical address. In such an address configuration, a top of the hierarchy can be the row, then the bank, then the column. The closer to the least significant bits of the address that the channel select bits are located, the fewer the number of bytes that will be accessed per channel before moving to the next channel. In one example, channel select bits are located after the bank select bits. In another example, the channel select bits are interleaved with the column select bits.

In one example, the memory system 100 includes a register 106 to adjust channel depth within the dynamic channel 110. Example configurations using a register 106, include selection of a channel depth by request from a hardware master 142.

Figure 2:
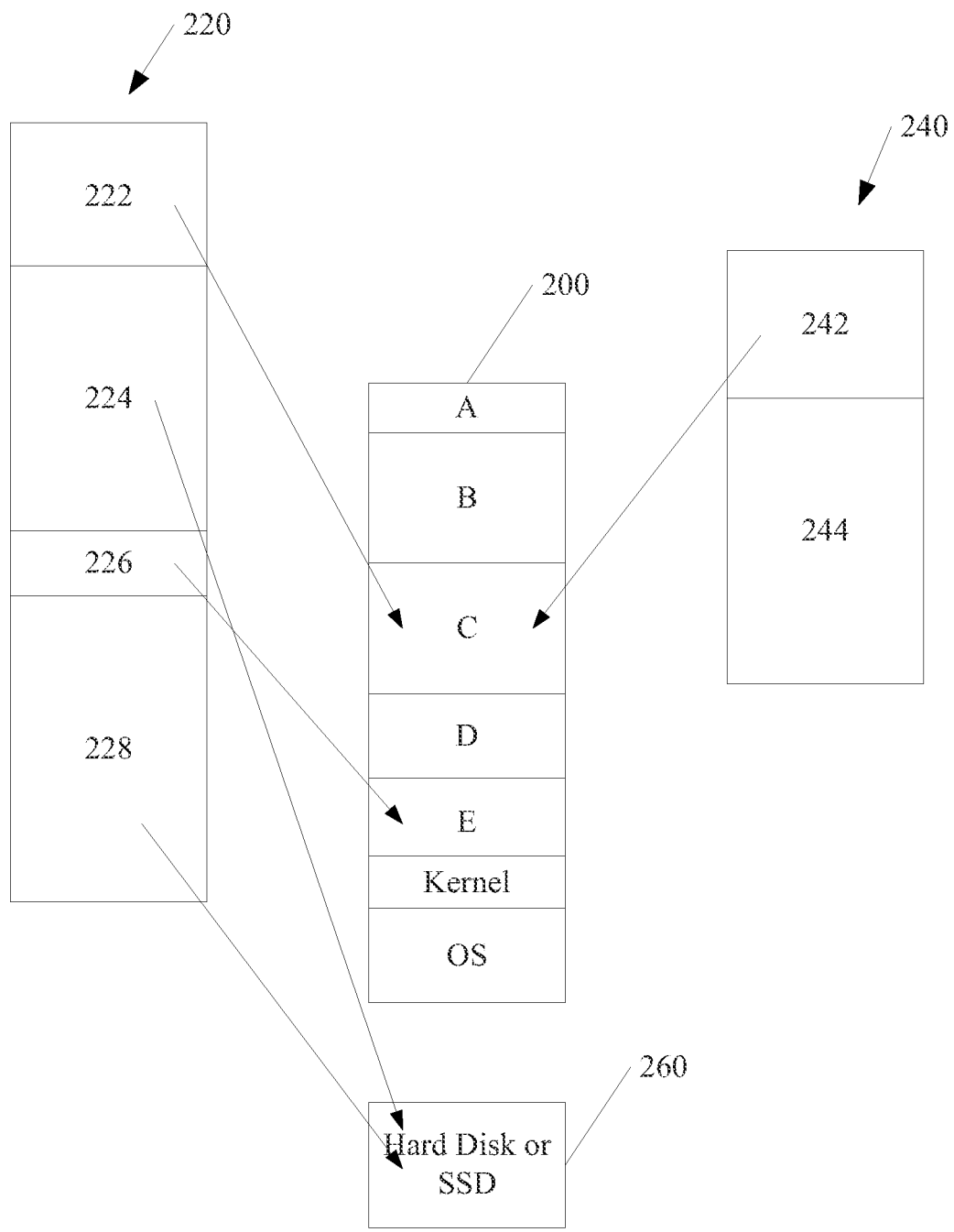
FIG. 2 shows a block diagram of a memory system in operation according to an embodiment of the invention.

FIG. 2 shows a memory system, such as memory system 100 from FIG. 1, comprising a first memory device 200. The first memory device 200 (e.g., a main memory module or modules) is shown as being conceptually divided (e.g., by a memory map) into a number of regions A-E that are used below in discussion of memory operations. Also shown are a Kernel region, and an operating system region (OS). Although the regions A-E, Kernel, and OS are shown occupying all of the space of the first memory device 200, the block diagram of FIG. 2 is only a regional example. For example, the physical memory and/or virtual memory of a memory system may be larger or smaller than the illustration shown in FIG. 2.

In one example, memory device 200 is coupled to a dynamic channel, such as dynamic channel 110 as shown in FIG. 1. In one example, regions A-E can all be accessed using the memory map to dynamically select channel depths. In one example, the Kernel region is accessed using a fixed channel depth. In one example, the OS region is accessed using a fixed channel depth. In one example, both the Kernel and the OS regions have a fixed channel depth. The respective fixed channel depths of the Kernel and the OS regions may be the same depth, or they may have different fixed channel depths, depending on requirements such as memory speed and power requirements.

A secondary memory device 260 (e.g. a hard disk drive or solid state drive (SSD)) is also illustrated in FIG. 2. In selected embodiments of the invention, a virtual memory configuration such as a paging configuration uses the secondary memory device 260 to expand the memory capabilities of the memory system.

A first memory operation (e.g., virtual memory process 220) and a subsequent, second memory operation (e.g., virtual memory process 240) are shown in FIG. 2. In one example, the requirements (e.g. latency, bandwidth, power) of the first memory process 220 are different than the requirements of the second memory process 240. The first process 220 is shown having data part 222 (e.g., a page) allocated (e.g., by the operating system) to region C, data part 226 allocated to region E, and data parts 224 and 228 allocated to secondary memory 260. The second process 240 is shown having data part 242 allocated to region C at a different time, such as where the operating system has re-allocated region C to the second process 240 after the first process 220 has been completed.

In one embodiment, when pages of a virtual memory are allocated by the OS, a channel depth for the pages is declared at that time. In one example, the declared channel depth is persistent until the page is swapped out, or reclaimed when a given process is complete. Because different processes using virtual memory can have different requirements with regard to latency, bandwidth, and power, the process of accessing the memory using different depths at different times can produce optimized memory accesses for the particular process, running at that time.

In the second memory process 240 of FIG. 2, a second channel depth is declared, responsive to (e.g., based on) the requirements of the second memory process 240. As discussed in embodiments above, the requirements can be either hardware based, software based, or both. The example of FIG. 2 illustrates that in selected memory operations including two or more memory processes (220, 240), a channel depth can be configured differently over time, even though different memory processes use the same physical region of memory (C).

Figure 3:
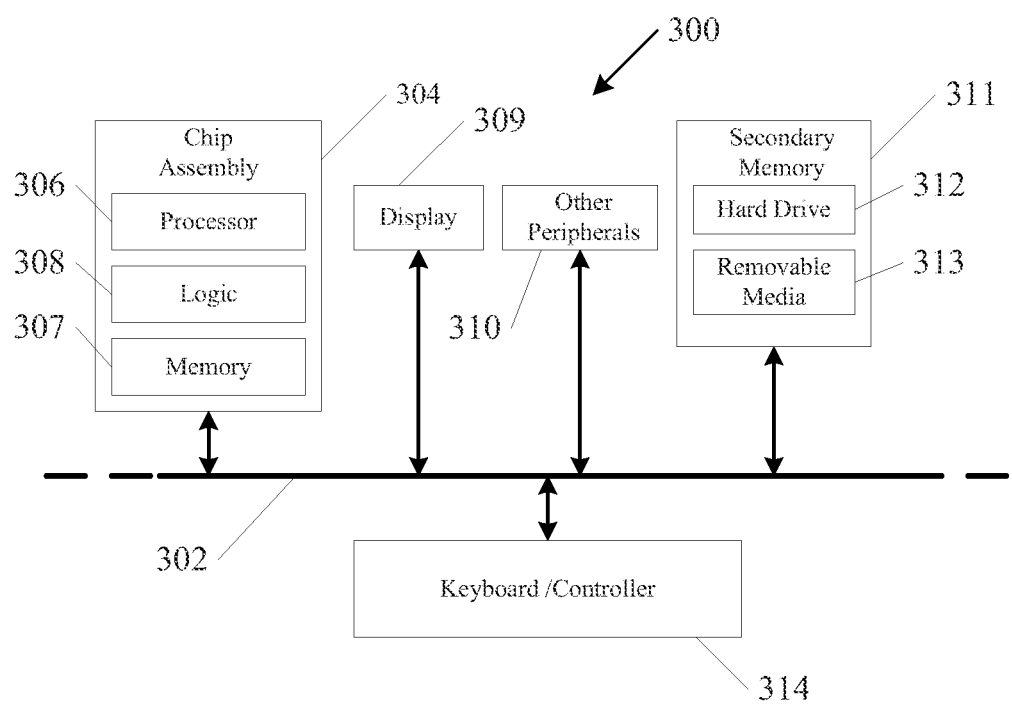
FIG. 3 shows an information handling system including a memory device according to an embodiment of the invention.

An embodiment of an information handling system such as a computer is included in FIG. 3 to show an embodiment of a higher-level device application for the present invention. FIG. 3 is a block diagram of an information handling system 300 incorporating a dynamic channel memory device of the invention as described above. Information handling system 300 is merely one embodiment of a system in which dynamic channel memory devices of the present invention can be used. Other examples include, but are not limited to, netbooks, cameras, personal data assistants (PDAs), cellular telephones, MP3 players, aircraft, satellites, military vehicles, etc.

In this example, information handling system 300 comprises a data processing system that includes a system bus 302 to couple the various components of the system. System bus 302 provides communications links among the various components of the information handling system 300 and may be implemented as a single bus, as a combination of busses, or in any other suitable manner.

Chip assembly 304 is coupled to the system bus 302. Chip assembly 304 may include any circuit or operably compatible combination of circuits. In one embodiment, chip assembly 304 includes a processor 306 that can be of any type. As used herein, "processor" means any type of computational circuit such as, but not limited to, a microprocessor, a microcontroller, a graphics processor, a digital signal processor (DSP), or any other type of processor, processing circuit or cores thereof.

In one embodiment, a memory device 307 is included in the chip assembly 304. In one embodiment, additional logic chips 308 other than processor chips are included in the chip assembly 304. An example of a logic chip 308 other than a processor includes a memory controller. Other circuits on logic chips 308 such as custom circuits, an application-specific integrated circuit (ASIC), etc. are also included in one embodiment of the invention.

Information handling system 300 may also include secondary memory 311, which in turn can include one or more memory elements suitable to the particular application, such as one or more hard drives 312, and/or one or more drives that handle removable media 313 such as compact disks (CDs), flash drives, digital video disks (DVDs), and the like.

Information handling system 300 may also include a display device 309 such as a monitor, additional peripheral components 310, such as speakers, etc. and a keyboard and/or controller 314, which can include a mouse, trackball, game controller, voice-recognition device, or any other device that permits a system user to input data into and receive data from the information handling system 300.

While a number of embodiments of the invention are described, the above lists are not intended to be exhaustive.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. It is to be understood that the above description is intended to be illustrative and not restrictive. Combinations of the above embodiments, and other embodiments, will be apparent to those of skill in the art upon studying the above description.

What is claimed is:

1. A method comprising:
    accessing a memory region of a memory device during a first memory operation by using a dynamic channel including multiple parallel channel portions each having a first channel depth, the first channel depth being a number of bytes that can be accessed using a particular one of the parallel channel portions before using a next channel portion during the first memory operation; and
    in response to the memory region being allocated to a second memory operation, dynamically adjusting the channel depth of each channel portion of the dynamic channel from the first channel depth to a different second channel depth to access the memory region.

2. The method of claim 1, wherein the first memory operation is performed by using a first configurable channel portion and a second configurable channel portion of the dynamic channel, with the first configurable channel portion used before using the second channel portion in the first memory operation and with a third configurable channel portion of the dynamic channel left idle in the first memory operation and a second memory region, associated with the third configurable channel portion, not powered up based on the idle of the third configurable channel portion.

3. The method of claim 1, wherein dynamically adjusting the channel depth comprises dynamically adjusting the channel depth based on a capability of software using the memory region during the second memory operation.

4. The method of claim 1, wherein dynamically adjusting the channel depth comprises adjusting the channel depth based on a capability of hardware using the memory region during the second memory operation.

5. The method of claim 1, wherein dynamically adjusting the channel depth comprises sending a channel depth selection signal from a hardware master.

6. The method of claim 1, wherein dynamically adjusting the channel depth comprises adjusting the channel depth responsive to a register in a memory controller coupled to the memory device.

7. The method of claim 1, wherein the channel depth is persistent with data from a master to a memory controller.

8. The method of claim 1, wherein dynamically adjusting the channel depth comprises adjusting the channel depth responsive to a memory request.

9. A system, comprising:
    a memory controller to manage a virtual memory process;
    one or more memory devices comprising respective memory regions;
    a dynamic channel including multiple configurable parallel channel portions to access memory regions, wherein a first configurable channel portion of the parallel channel portions has a first channel depth during a first memory operation on a first memory region, wherein a channel depth of the multiple configurable parallel channel portions is a number of bytes that can be accessed using a respective channel portion before using a next channel portion during the first memory operation; and
    a memory map comprising instructions, stored by the one or more memory devices, configured to be executed by the memory controller to adjust the channel depth of the first configurable channel portion from the first channel depth to a second channel depth responsive to the first memory region being allocated to a second memory operation different from the first memory operation.

10. The system of claim 9, wherein a second configurable channel portion of the dynamic channel is set idle in the second memory operation with a second memory region, associated with a second configurable channel portion, not powered up based on the idle of the second configurable channel portion.

11. The system of claim 9, wherein the memory map includes instructions for the memory controller to interpret channel depth requests from within an address in a memory request.

12. The system of claim 9, wherein the memory map includes instructions for the memory controller to interpret channel depth requests from multiple different hardware masters.

13. The system of claim 9, wherein a channel depth of a kernel memory region is fixed.

14. The system of claim 9, wherein a channel depth of an operating system memory region is fixed.

15. A method, wherein a memory region of a memory device is accessed during a first memory operation using a configurable channel portion of a dynamic channel having a channel depth, the method comprising:
    dynamically adjusting the channel depth of the channel portion of the channel, responsive to the memory region being allocated to a second memory operation, wherein the channel depth of the channel portion includes a number of bytes that can be accessed using the channel portion before using a next channel portion of the dynamic channel during the second memory operation.

16. The method of claim 15, wherein the memory region of the memory device is accessed responsive to a first memory request using the channel depth, the method comprising:
    adjusting the channel depth responsive to channel select bits in a second memory request.

17. The method of claim 16, wherein the second memory request further includes row select bits and bank select bits, wherein the channel select bits are after the bank select bits, and wherein the channel select bits are interleaved with the column select bits.

18. The method of claim 15, wherein the memory region of a memory device having the channel depth is allocated to a first page of virtual memory, the method comprising:
    adjusting the channel depth responsive to allocating the memory region to a second page of the virtual memory.

19. The method of claim 18, wherein the memory region comprises a first memory region, and wherein a channel depth of a second memory region of the memory device is fixed during operation of the memory device.

20. The method of claim 15, wherein the first memory operation is performed by using a first configurable channel portion and a second configurable channel portion of the dynamic channel, with the first configurable channel portion used before using the second configurable channel portion in the first memory operation and with a third configurable channel portion of the dynamic channel left idle in the first memory operation and a second memory region, associated with the third configurable channel portion, not powered up based on the idle of the third configurable channel portion.

\* \* \* \* \*